United States Patent
Atkins et al.

(10) Patent No.: US 11,991,380 B2
(45) Date of Patent: May 21, 2024

(54) DISTRIBUTION OF HIGH DYNAMIC RANGE IMAGES IN A MIXED CAPABILITY PLAYBACK SYSTEM

(71) Applicant: Dolby Laboratories Licensing Corporation, San Francisco, CA (US)

(72) Inventors: Robin Atkins, Vancouver (CA); Guan-Ming Su, Fremont, CA (US); Gopi Lakshminarayanan, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 39 days.

(21) Appl. No.: 18/009,846

(22) PCT Filed: Jun. 30, 2021

(86) PCT No.: PCT/US2021/040004
§ 371 (c)(1),
(2) Date: Dec. 12, 2022

(87) PCT Pub. No.: WO2022/006346
PCT Pub. Date: Jan. 6, 2022

(65) Prior Publication Data
US 2023/0232028 A1    Jul. 20, 2023

Related U.S. Application Data

(60) Provisional application No. 63/046,796, filed on Jul. 1, 2020.

(30) Foreign Application Priority Data

Jul. 1, 2020    (EP) .................................... 20183398

(51) Int. Cl.
H04N 19/46 (2014.01)
G06T 7/90 (2017.01)
H04N 19/30 (2014.01)

(52) U.S. Cl.
CPC ............... *H04N 19/46* (2014.11); *G06T 7/90* (2017.01); *H04N 19/30* (2014.11); *G06T 2207/10024* (2013.01); *G06T 2207/20208* (2013.01)

(58) Field of Classification Search
CPC .......... H04N 19/46; H04N 19/30; G06T 7/90; G06T 2207/10024; G06T 2207/20208
See application file for complete search history.

(56) References Cited

U.S. PATENT DOCUMENTS

2017/0064334 A1    3/2017    Minoo
2018/0077453 A1    3/2018    Oh
(Continued)

FOREIGN PATENT DOCUMENTS

EP    3367684 A1    8/2018
JP    2020507958 A    3/2020
(Continued)

OTHER PUBLICATIONS

Lasserre (Technicolor) S et al., "Single Layer Low-Bit Depth EDR Video Coding with SDR/HDR Backward Compatibilities," 111. MPEG Meeting; Feb. 16, 2015-Feb. 20, 2015, Geneva, (Motion Picture Expert Group or ISO/IEC JTC1/SC29/WG11), No. m36083, Feb. 17, 2015, XP030064451.

*Primary Examiner* — Sunghyoun Park (57) ABSTRACT

A method for distributing High Dynamic Range (HDR) content to playback devices for displaying images where the HDR content is encoded to an HDR bitstream and the HDR bitstream is subsequently decoded by a playback device. The
(Continued)

HDR bitstream contains auxiliary metadata packets that are based upon the processing capability of the playback device.

7 Claims, 4 Drawing Sheets

(56) References Cited

U.S. PATENT DOCUMENTS

| | | |
|---|---|---|
| 2019/0272643 A1 | 9/2019 | Gadgil |
| 2020/0045340 A1* | 2/2020 | Chen .................. H04N 19/20 |
| 2020/0134792 A1* | 4/2020 | Mandal .................. G06T 5/92 |
| 2020/0154143 A1 | 5/2020 | Tsukagoshi |
| 2021/0266608 A1 | 8/2021 | Adrivon |
| 2021/0287348 A1* | 9/2021 | Partin .................. H04N 1/6066 |

FOREIGN PATENT DOCUMENTS

| | | |
|---|---|---|
| JP | 2021530884 A | 11/2021 |
| WO | 2006050305 A1 | 5/2006 |
| WO | 2019017362 A1 | 1/2019 |
| WO | 2020016331 A1 | 1/2020 |

* cited by examiner

DISTRIBUTION OF HIGH DYNAMIC RANGE IMAGES IN A MIXED CAPABILITY PLAYBACK SYSTEM

CROSS-REFERENCE TO RELATED APPLICATIONS

This application is the United States national stage entry of International Patent Application No. PCT/US2021/040004, filed Jun. 30, 2021, which claims priority of U.S. Provisional Patent Application No. 63/046,796, filed Jul. 1, 2020, and European Patent Application No. 20183398.5, filed Jul. 1, 2020, both of which are incorporated herein by reference in their entirety.

BACKGROUND

1. Field

The present invention relates to high dynamic range imagery, More particularly, an embodiment of the present invention relates to delivering high dynamic range imagery content to playback devices having varying levels of processing capability.

2. Description of Related Art

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. HDR playback systems are systems that facilitate the display of HDR imagery. In video display systems, HDR video playback systems are typically characterized by the display of video imagery of improved range of color and improved contrast when compared to standard video playback systems.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, the methods of the present disclosure relate to any dynamic range higher than SDR.

WO 2006/050305 A1 discloses a method and system for mastering and distributing enhanced color space content for different display devices (target color space) having display capabilities beyond that of CRT color space. The content creator(s) establishes base or reference color space and enhanced color space data for each target color space. The enhanced color space data is stored as metadata and transmitted over an enhanced color channel separately from the base/reference color space. Both the base/reference data and metadata are encoded before transmission and decoded on the consumer side either by a separate decoder or a display device having an integrated decoder. Auxiliary data relating to the target color space, such as brightness, luminance, contrast and other display settings can be transmitted over the enhanced color channel and decoded to control the target color space settings including display settings. The color adjustment metadata could be included in the auxiliary data or maintained separate from the same.

US 2017/064334 A1 discloses a method of encoding a digital video, comprising receiving a high dynamic range (HDR) master of a video, a reference standard dynamic range (SDR) master of the video, and target SDR display properties at an encoder, finding a color volume transform that converts HDR values from the HDR master into SDR values that, when converted for display on the target SDR display, are substantially similar to SDR values in the reference SDR master, converting HDR values from the HDR master into SDR values using the color volume transform, generating metadata items that identifies the color volume transform to decoders, and encoding the SDR values into a bitstream.

US 2018/077453 A1 discloses a device and a method for transmitting/receiving a broadcast signal including video data and high dynamic range information. A broadcast signal transmitting method may include the steps of generating video data, generating a broadcast signal including the generated video data and image quality improving metadata, and transmitting the generated broadcast signal.

EP 3 367 684 A1 discloses a method and device for reconstructing an HDR image by applying a reconstruction process on a SDR image whose the content is similar to the content of the HDR image but the dynamic range of the luminance values of said SDR image is lower than the dynamic range of the luminance values of said HDR image, said reconstruction process requiring parameters obtained from a bitstream. The method is characterized in that the method further comprises determining whether all the required parameters are available from the bitstream and recovering the lost or corrupted parameters from additional data, said reconstruction process further taking into account said recovered parameters.

SUMMARY

The invention is defined by the independent claims. The dependent claims concern optional features of some embodiments of the invention. An embodiment of the present invention is based on a method for distributing High Dynamic Range (HDR) content to playback devices for displaying images based on the HDR content comprising: encoding the HDR content to an HDR bitstream, wherein encoding the HDR content comprises: mapping an HDR image in the HDR bitstream to one or more specified color volume base layer; generating one or more Primary Metadata Packets based on the HDR content; generating one or more Auxiliary Metadata Packets, wherein information in the Auxiliary Metadata packets is based on the capabilities of the playback devices; encoding the one or more specified color volume base layers to one or more specified coded base layers; and combining the one or more specified coded base layers, one or more Primary Metadata Packets and one or more Auxiliary Metadata Packets to produce the HDR bitstream; and decoding the HDR bitstream, wherein decoding the HDR bitstream comprises: selecting information from the one or more Primary Metadata Packets and the one or more Auxiliary Metadata packets based on the capability of a target playback device; processing the one or more coded base layers in the HDR bitstream based on the selected information to produce images for display on the target playback device.

An embodiment of the present invention is based on a method for encoding HDR content to an HDR bitstream, wherein the method comprises: mapping an HDR image in the HDR content to one or more specified color volume, electro-optical transfer function (EOTF), and peak luminance base layers; generating one or more Primary Metadata Packets based on the HDR content; generating one or more Auxiliary Metadata Packets, wherein information in the Auxiliary Metadata packets is based on capabilities of one or more playback devices; encoding the one or more specified color volume, EOTF, and peak luminance base layers to one or more specified coded base layers; and combining the one or more specified coded base layers, one or more Primary Metadata. Packets and one or more Auxiliary Metadata Packets to produce the HDR bitstream.

An embodiment of the present invention is based on a method for decoding an HDR bitstream, wherein the HDR bitstream comprises one or more coded base layers, one or more Primary Metadata Packets and one or more Auxiliary Metadata Packets, and the method comprises: selecting information from the one or more Primary Metadata Packets and the one or more Auxiliary Metadata packets based on the capability of a target playback device; processing the one or more coded base layers in the HDR bitstream based on the selected information to produce images for display on the target playback device.

BRIEF DESCRIPTION OF THE SEVERAL VIEWS OF THE DRAWINGS

An embodiment of the present invention is illustrated by way of example, and not in way by limitation, in the figures of the accompanying drawings and in which like reference numerals refer to similar elements and in which.

DETAILED DESCRIPTION

Current HDR systems are mostly targeted towards high-end playback devices. However, lower-end playback devices, such as those seen in mobile systems would benefit from HDR content, Lower-end playback systems are typically characterized by only being able to perform minimal or maybe no processing, due to limitations of the processor in the systems. An embodiment of the present invention provides for delivering HDR content to a mixed range of playback devices, ranging from very low performance to very high.

As used herein, "metadata" refers to data characterizing or referring to the bitstream, resulting image, and/or devices used in the process of turning the bitstream into the resulting image. As used herein "primary metadata" refers to data describing characteristics of the HDR image as well as composer data. As used herein, "auxiliary metadata" refers to data describing the capabilities of the playback device in addition to display mapping data for the image.

Figure 1:
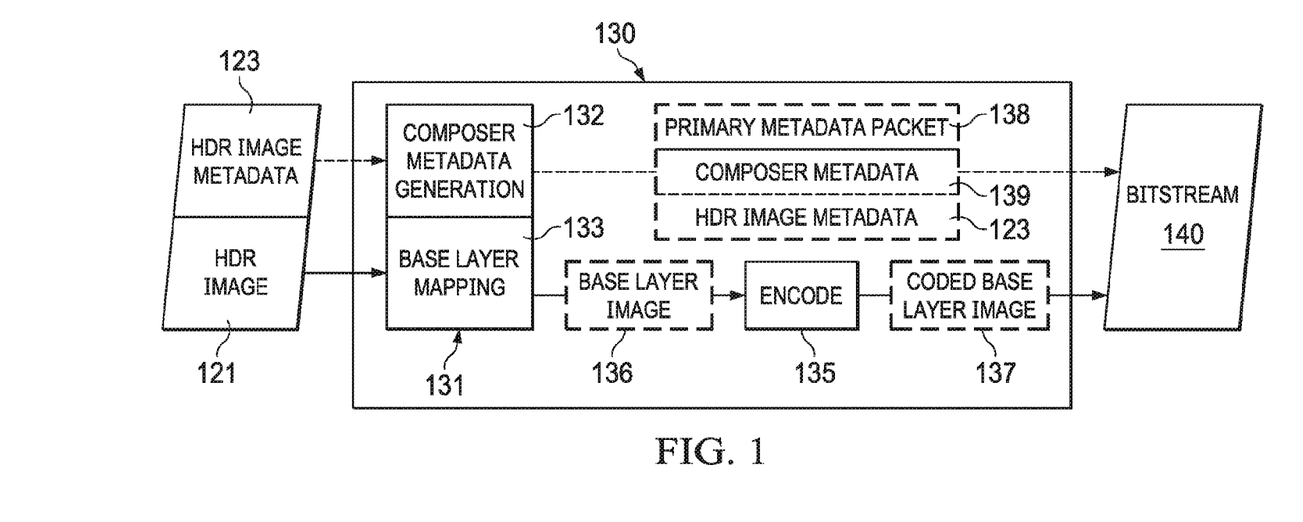
FIG. 1 shows a block diagram of an exemplary implementation of an HDR bitstream encoding process.

FIG. 1 shows a block diagram of an exemplary implementation of the encoding process. In FIG. 1, an HDR image 121 and any "HDR image metadata" 123 is input to an encoder 130. The encoder 130 comprises a first pre-processing step 131 and a second encoding step 135. In an embodiment, the encoding step 135 may comprise a video compression step, such as known in the art (e.g., AVC, HEVC, AV1 and the like). The pre-processing step 131 performs mapping 133 to a selected color volume to generate a base layer image 136, and simultaneously generates 132 composer metadata 139 that allows a playback device to revert the base layer mapping to reconstruct the original HDR image. Typically, the base layer mapping is chosen to enable compatibility with certain playback devices, for example "SDR", "HDR10", or "HLG" devices. The composer metadata 139, in additional to any HDR image metadata 123, is combined to create the primary metadata packet 138. The encoding step generates a coded base layer image 137 from the base layer image 136. The combination of the coded bit base layer image 137 and the primary metadata packet 138 comprises the bitstream 140 (e.g. a Dolby Vison™ bitstream).

Figure 2:
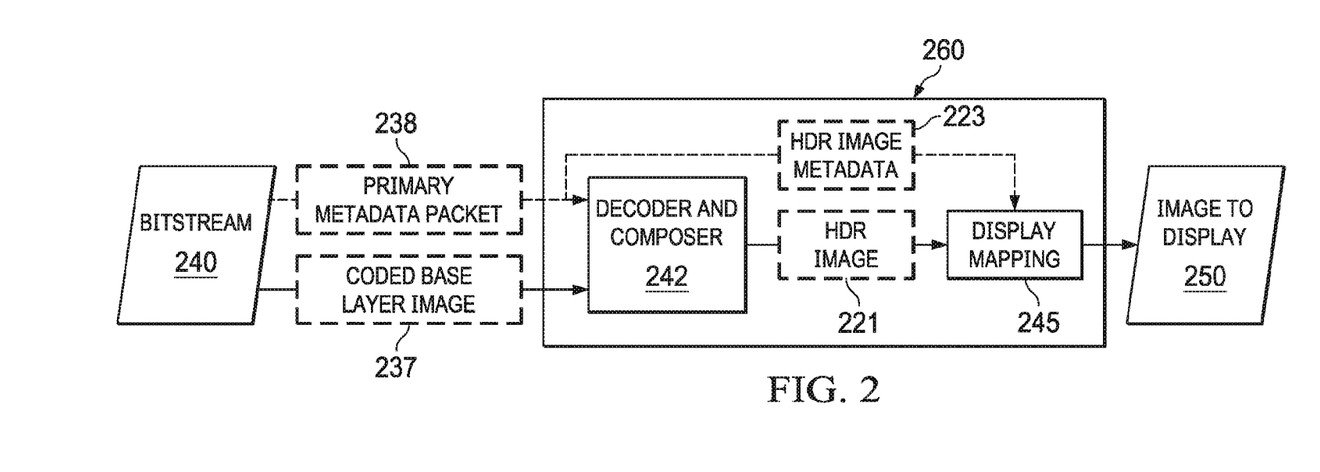
FIG. 2 shows a block diagram of an exemplary process to generate an image from HDR bitstream using a playback process.

FIG. 2 shows a block diagram of an exemplary process to generate an image from a bitstream 240 using a playback process 260. As shown in FIG. 2, in the playback process 260, a decoder and composer step 242 first decodes the coded base layer image 237, then applies the composer metadata from the primary metadata packet 238 to reconstruct the original HDR image 221. The display mapping step 245 then maps the HDR image 221 to the target display 250, under the guidance of the HDR image metadata 223. The decoder and composer process 242 corresponds to a decoding process compatible with the encoding process 135 shown in FIG. 1.

Playback device operations, such as those shown in FIG. 2, may require a substantial amount of processing capability, first, in applying the decoder and composer process 242, and second, in applying the display mapping process 245, both of which may vary from frame to frame.

The discussion of Dolby Vision and Dolby Vision bitstreams presented above provides an overview of the encoding and decoding processes for HDR images, Those skilled in the art understand that other processes may be used for encoding and decoding HDR images for display on target displays.

According to an embodiment of the present invention, playback complexity may be simplified by: 1) adding auxiliary metadata packets and 2) optimizing the base layer image for mapping to a class of target displays. The addition of auxiliary metadata packets can be selected depending on the processing capabilities of various playback devices. At least one of these auxiliary metadata packets contains only static composer (causing the playback device to bypass the composer) and display mapping (DM) metadata describing the color volume and signal encoding of the base layer. Additional auxiliary metadata packets may be selected based on playback device capability to add increasing levels of functionality towards the complete metadata packet. A key for optimizing the base layer is that the bulk of the dynamic high-quality mapping is performed during encoding (132), so that less secondary mapping (245) is required by the playback device. This secondary mapping can therefore have reduced complexity, thus making it possible to run on a greater number of low-capability playback devices. In one embodiment, the secondary mapping may be static.

Figure 3:
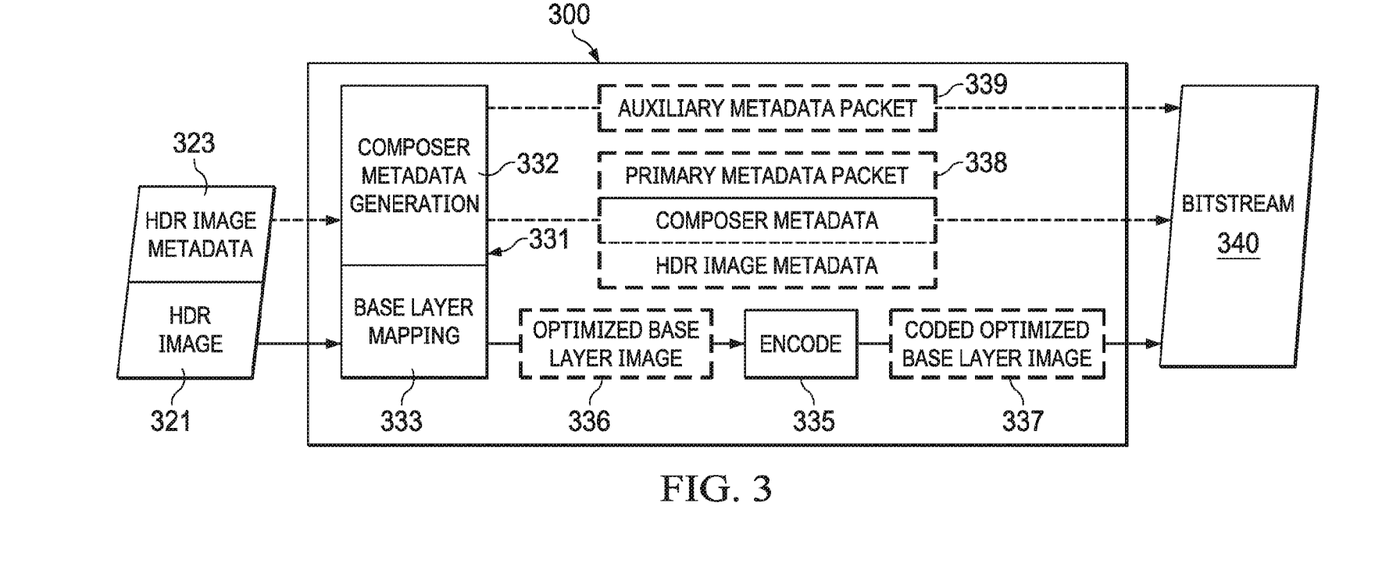
FIG. 3 shows a block diagram of an encoder that employs both addition of auxiliary metadata packets and optimization of the base layer.

FIG. 3 shows a block diagram of an exemplary encoder 300 that employs both addition of auxiliary metadata packets and optimization of the base layer. In FIG. 3, the HDR image 321 and HDR image metadata 323 is input to the encoder 300. The encoder 300 comprises a first pre-processing step 331 and a second encoding step 335 comprising compression or other processing to generate a coded optimized base layer image 337 for the bitstream 340. The pre-processing step 331 may perform an optimized mapping 333 to an optimal color volume to generate an optimized base layer image 336. The pre-processing step 332 simultaneously generates the primary metadata packet 338 in a manner such as that described above in regards to FIG. 1. The pre-processing step 332 also generates one or more auxiliary metadata packets 339. The encoding step 335 generates a coded optimized base layer image 337 from the optimized base layer image 336. The encoding step 335 may generate one or more versions of the content from the same original HDR image in a manner described in additional detail below. The combination of the coded optimized base layer image 337, the primary metadata packet 338, and the auxiliary data packet 339 comprises a bitstream 340 configured for playback on a mixed range of playback devices.

A playback device receiving a bitstream with auxiliary data packets may be configured to select between the primary metadata packet or auxiliary metadata packets based on the processing capabilities of the device. These capabilities may be due to hardware limitations of the device and may also be dynamically selected based on the availability of processing power or battery power. A very capable playback device may follow the operations as illustrated in FIG. 1, while a low-complexity playback device may take advantage of the auxiliary metadata packet to simplify the playback processing (see e.g. FIG. 4).

Figure 4:
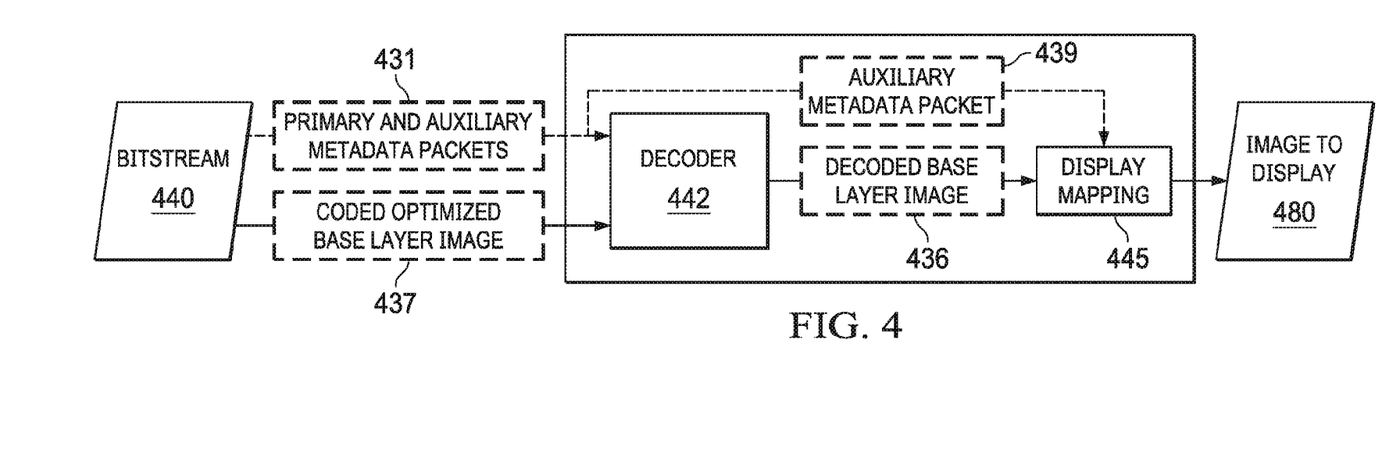
FIG. 4 shows a block diagram of a low complexity playback process for producing an image from an HDR bitstream containing auxiliary metadata packets.

FIG. 4 shows a block diagram of an exemplary low complexity playback process for producing an image from the bitstream 440 containing primary and auxiliary metadata packets 431. As shown in FIG. 4, the playback process has a decoder step 442 that decodes the coded optimized base layer image 437 to an optimized base layer image 436. The display mapping step 445 then maps the optimized base layer image 436 to the target display 480, under the guidance of the auxiliary metadata 439. In the low complexity embodiment shown in FIG. 4, a composer (as shown in FIG. 2) is not required to reconstruct the HDR image. Instead, the optimized base layer image 436 is mapped to the output 480 based only on auxiliary metadata packet 439. In one embodiment, this auxiliary metadata packet remains static for the duration of the content, thus requiring minimal dynamic processing.

In some implementations (e.g. Dolby Vision), there may be multiple versions of the same content, encoded with different encoding settings. For example, an encoder may be configured to produce two or more bitstreams intended for different playback devices. The difference between these versions is the compatibility of the base layer.

For example, there may be a "most compatible" base layer with a color volume that corresponds to SDR (Standard Dynamic Range). This base layer can be viewed on any legacy SDR playback device that does not have HDR capabilities. An HDR playback device, by contrast, may apply both the "composer" and the "mapping" to optimally display the image, such as shown by the process illustrated in FIG. 2. According to this invention, an HDR playback device may alternately use the auxiliary metadata packet to directly map the SDR signal to the target device capabilities (e.g. FIG. 4).

There may also be a "least compatible" base layer, which has a color volume corresponding to the original HDR Image. This base layer is not directly viewable on an SDR playback device. An HDR playback device may be configured according to FIG. 2 to process the base layer with the composer, followed by display mapping.

There may also be an "intermediate compatible" base layer, which is in between the extremes of the "most compatible" and "least compatible" base layers. The color volume of this intermediate base layer can be configurable. In a preferred embodiment, the color volume is configured to the average of the color volumes of the targeted playback devices. In one embodiment, the base layer color volume corresponds to P3 primaries and, 200-400 nits peak luminance. A legacy (non-HDR) playback device may be able to correctly and optimally display the decoded image, if the characteristics of the playback device match those of the base layer. A fully capable playback device can apply the composer and mapping processes using the primary metadata packet to optimally render the device (e.g. FIG. 2), and a limited capability playback device can decode and apply a limited display mapping process using the auxiliary metadata packet to achieve an image quality that is between these two (e.g. FIG. 4).

In embodiments according to the present invention, the bitstream may contain both primary and auxiliary metadata. The choice of compatibility is up to the user. In general, the "most compatible" can reach the greatest number of devices, while the "least compatible" only has the best image quality for compatible devices (or, the original HDR image which deviates the most from an SDR image). An embodiment of the present invention with a configurable base layer and auxiliary metadata provides for image quality that may fall between the most and least compatible configurations. Note that a playback system 260 as shown in FIG. 2 would have minor quality difference in the reconstructed HDR image using "most compatible", "intermediate compatible", or "least compatible" content types, depending on the color volume and peak luminance values of the playback device.

An embodiment of an encoder according to the present invention may be configured to generate one or more versions of content from the same original HDR image including: "most compatible" content version; "intermediate compatible" content version; and "least compatible" content version. "Most compatible" content is derived by automatically mapping from HDR to a compatible base layer SDR. It also includes metadata for playback devices to reconstruct the original HDR and perform mapping from HDR to the target display. The color volume of the base layer may be 100 nits, R709 to maximize compatibility with playback devices that are expecting SDR content. "Intermediate compatible" content is derived by automatically mapping from HDR to a non-compatible base layer (herein referred to as a "medium dynamic range" base layer, or MDR). The color volume of the base layer can be configurable. In one embodiment, the color volume is configured to the average of the color volumes of the targeted playback devices. In another embodiment, the base layer color volume corresponds to P3 primaries and 200 nits peak luminance. The "least compatible" version essentially is the HDR image as described above.

Note also that the encoder may also be configured to create a completely non-HDR version of the content, without any metadata. This latter version is typically derived independently of the HDR image using a different processing flow.

According to an embodiment of the present invention, the bitstream contains both primary and one or more auxiliary metadata packets. The primary metadata packet may contain: composer metadata, that when applied to the base layer by a composer, causes the composer to reconstruct the original HDR version as closely as possible; and display mapping metadata corresponding to the reconstructed HDR, that, when applied to the reconstructed HDR image by a display mapping process, causes the display mapping process to map the reconstructed HDR to the capabilities of the target device. The auxiliary metadata packet may comprise: an identifier that describes the processing capabilities of the playback device; a signal to bypass the composer; and display mapping metadata corresponding to the mapped base layer, that, when applied to the base layer by a display mapping process, causes the display mapping process to map the base layer to the capabilities of the target device.

The different content versions, including their associated metadata, may be encoded using standard codecs, which may include adaptive bitrate ladders, and made available for distribution.

As indicated above, a wide range of playback devices may be supplied with the same bitstream. The final image quality depends on the capabilities of the playback device, and the availability of different content versions. An embodiment of this invention provides for consistency in the playback image quality among this wide range of playback devices.

According to an embodiment of the present invention, a method for distributing HDR content to a playback device for displaying images based on that HDR content is provided, Examples of distributing content include streaming, video-on-demand, broadcasting, digital file transmission, and others. Examples of playback devices include computers, televisions, tablets, smartphones, projectors, and others. The method can include encoding the HDR content to an HDR bitstream. The encoding can comprise a mapping of HDR images in the HDR bitstream to a specified color volume base layer, which can then be encoded to a coded base layer. For example, the HDR images can be mapped and encoded to an SDR base layer and/or an MDR base layer. The encoding can also comprise generating primary and/or auxiliary metadata into corresponding metadata packets. The primary metadata can be based on the HDR content, whereas the auxiliary metadata can be based on the base layer. The coded base layer and both primary and auxiliary metadata are combined into the bitstream. The method can also include decoding the HDR bitstream, which can include selecting information from the primary or auxiliary metadata packets, or a combination of the two.

Figure 5A:
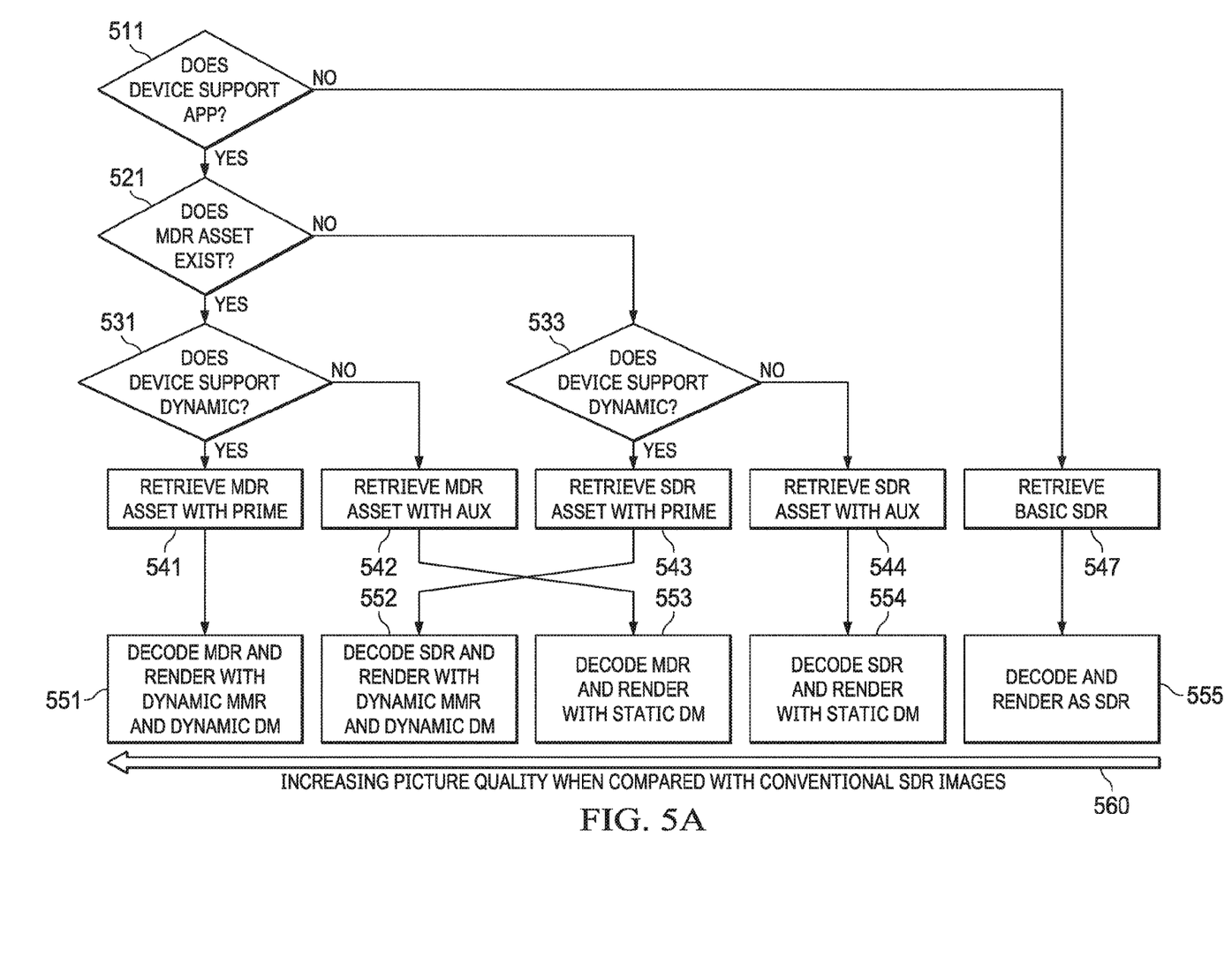
FIGS. 5A and 5B illustrate example decision trees on the application of playback processing in a playback device.
Figure 5B:
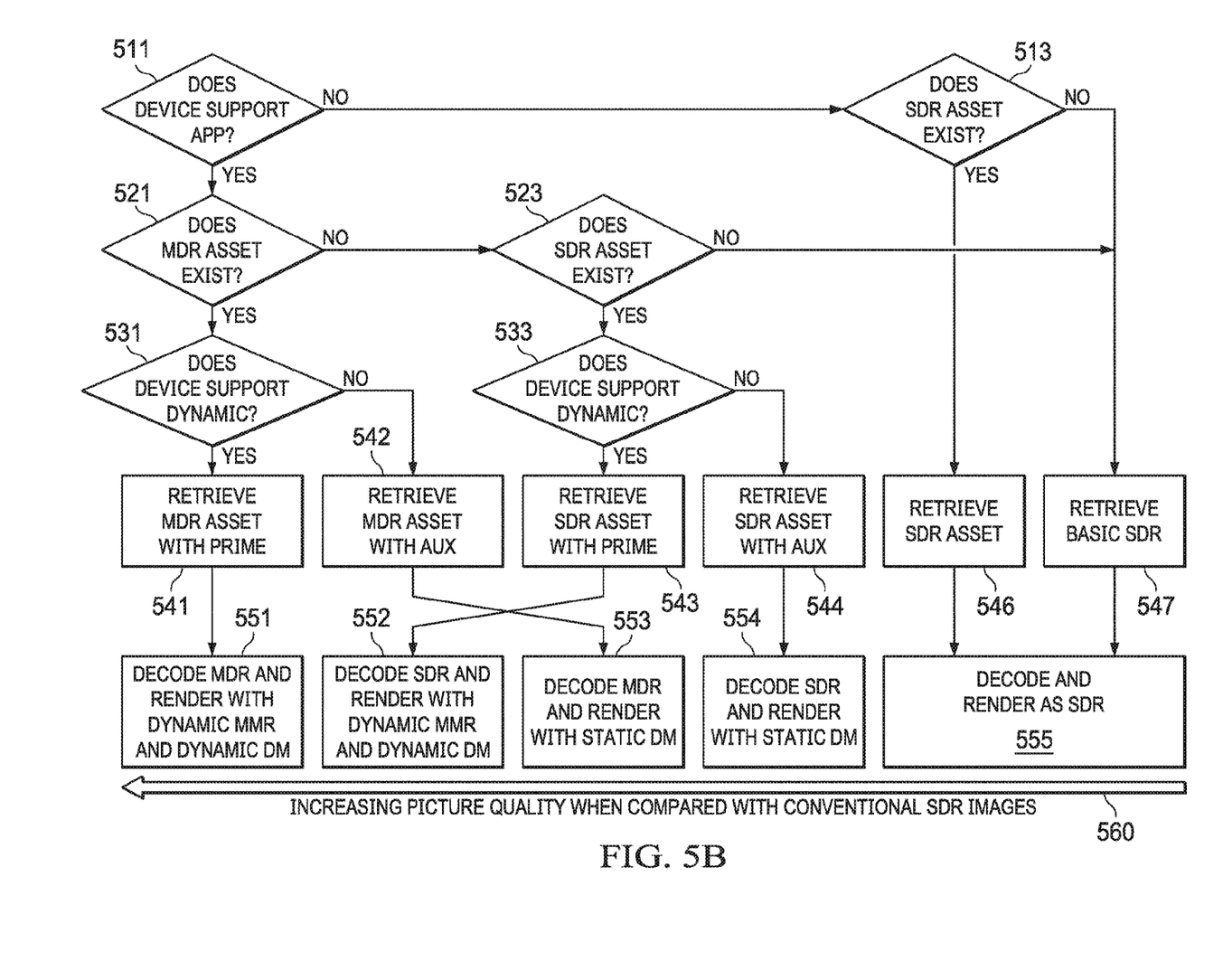

FIGS. 5A and 5B are examples of decision trees on the application of playback processing according to embodiments of the present invention. FIGS. 5A and 5B show how image quality improves depending on playback capability and content type. Note that, without limitation, the decision tree illustrated in FIG. 5A only addresses the situation where there is a single asset distributed and FIG. 5B only addresses the distribution of two assets, a most compatible bitstream and an intermediate compatible bitstream.

As used herein, "basic SDR" refers to an SDR base layer with either no metadata associated with it, or a minimal set of metadata (e.g. a $3^{rd}$ party metadata where only the basic functionality is supported by the device).

As used herein "primary metadata" (or PRIME) refers to metadata that utilizes dynamic processing (e.g. dynamic multivariate multiple regression and dynamic display management) on the display device.

As used herein "auxiliary metadata" (or AUX) refers to metadata that supports static processing at the decoder and is selected when dynamic processing will not be used on the display device.

As used herein "asset" refers to a base layer provided with both PRIME and AUX metadata. "SDR asset" refers to an asset where the base layer is the most compatible. "MDR asset" refers to an asset where the base layer is intermediately compatible. A bitstream can include multiple assets where the base layers share the same metadata. An example of an SDR Asset is DOLBY™ Profile P9.2. An example of an MDR Asset is DOLBY™ Profile P32.

In some embodiments, the base layer of an asset is derived from the HDR workflow. In some embodiments, the base layer of an asset is derived separately from the HDR workflow.

An example of asset use can be a user generated content (UGC) provider that only provides an SDR asset in the bitstream, providing the greatest reach (most compatible with devices) at a low bitrate cost. Another example of asset use can be a premium content provider that provides both an SDR asset and an MDR asset in the bitstream, providing maximal reach (by including the most compatible asset) while providing increased quality to higher-end devices (by including the intermediate compatible asset).

FIG. 5A shows an example flowchart of the system according to one embodiment. A determination 511 is made whether the playback device supports a compatible application the device can playback a Dolby Vision™ bitstream) for bitstream processing. A "compatible application" is an application on the playback device specifically designed for playback of the encoded bitstreams described herein. If not, the basic SDR base layer (547) is decoded and rendered 555 to generate the image as an SDR image. Whatever basic metadata information is available is used for the processing. If the application is supported 511, then a second determination 521 is made whether the MDR Asset exists in the bitstream.

If the MDR Asset exists 521, a determination 531 is made whether the device supports dynamic processing. Then, if dynamic processing is supported, then a high power decode and render operation 551 is performed on the MDR Asset and PRIME metadata 542 to generate the image with dynamic display mapping (e.g. dynamic display management—dynamic DM) and dynamic composer prediction (e.g. dynamic multivariate multiple regression—dynamic MMR) 551 (see e.g. FIG. 2 for high power processing).

If the MDR Asset exists 521 and the device does not support 531 dynamic processing, then a static decode and render operation 553 is performed on the MDR Asset with the AUX metadata 541 to generate the image (see e.g. FIG. 4 for low power processing).

If the MDR Asset does not exist 521 (or is not supported by the device) and the device supports 533 dynamic processing, then the SDR Asset with the PRIME metadata can be used 552 to produce a dynamically processed SDR image.

IF the MDR Asset does not exist 521 and the device does not support 533 dynamic processing, then the SDR Asset with the AUX metadata can be used 544 with static processing 554 to produce an SDR image.

In this way, a wide range of devices can be used while still providing increasingly improved image quality for devices that support it.

FIG. 5B shows an example flowchart of the system according to another embodiment. The flowchart is similar to that shown in FIG. 5A with the addition of decisions to see if an SDR Asset exists 513, 323. If the device does not support 511 a compatible application, but the SDR Asset exists 513, then the SDR Asset can be rendered 555 as SDR.

If the device does support 511 the application but the MDR Asset does not exist 521, the SDR Asset does exist 523, and the device supports 533 dynamic processing, then the SDR BL and the PRIME metadata can be used 543 to produce an SDR image rendered 552 with dynamic MMR and dynamic DM.

If the device does support the application 511 but the MDR Asset does not exist 521, the SDR Asset does exist 523, and the device does not support dynamic processing 533, then the SDR BL and the AUX metadata can be used 544 to produce 554 an SDR image with static DM.

If the device does support the application 511 but the MDR Asset does not exist 521 and the SDR Asset does not exist 523, the Basic SDR can be used 547 to decode and render 555 as SDR with whatever basic metadata is available.

Decision branches are not shown for a least compatible bitstream (e.g. HDR Asset) in FIGS. 5A and 5B. Decision branches for a least compatible bitstream would branch further to the left (that is, should generally be higher quality) and follow similar logic, except that least compatible bitstream also requires supporting dynamic playback capability.

In FIGS. 5A and 5B, the decisions to use only the primary (PRIME) or auxiliary (AUX) metadata packets are binary. However, a playback device may also be configured to select to use additional Auxiliary metadata packets that it can support in combination with the primary metadata. For example, the playback device may only have the capability for static composer and static display mapping, but the device may have the capability for dynamic resizing, frame rate letterbox padding/cropping, or other functionality. Also, decisions for processing may be based upon values in a configuration file, which may be specified by processing capabilities in the playback device. Decisions for processing may also be based on other factors such as: power supply levels in the playback device; other demands on processing capabilities in the playback device; user preferences, and additional content metadata.

In practice, the playback device might not use all the assets provided, but there is still value in allowing the MDR and SDR assets to co-exist. First, the MDR asset might not be sufficient for sufficient compatibility with target devices. But users with higher end and mid-range devices would expect better quality than would be provided with just the SDR asset, Since there is less mapping by the composer between the MDR BL and the HDR image, the inclusion of an MDR asset provides better quality, even for mid-range devices that only support static mapping. Note that the MDR asset has less constraints because the base layer is not expected to exactly match an SDR deliverable.

For an example of a Premium Content, with both an SDR Asset and MDR Asset, there at least three possibilities:
1. The device has the compatible application and supports R and Dynamic Processing→MDR Asset is used with dynamic processing (PRIME used),
2. The device has the compatible application and supports HDR, but not Dynamic Processing→MDR Asset is used without dynamic processing (AUX used), or
3. The device does not have the compatible application (e.g. competitor's device)→SDR Asset is used with universal (basic) metadata.

On the device side, for an example of a user having an HDR compatible device with the compatible application and supports dynamic processing, there are at least six possible outcomes:
1. A basic SDR stream is available (e.g. user-generated content without PRIME/AUX compatible encoding)→SDR+basic metadata used,
2. An old tech SDR Asset is available (PRIME only)→SUR+PRIME is used,
3. A new tech SDR Asset is available (PRIME and AUX)→SDR+PRIME is used,
4. A new tech SDR Asset is available (PRIME and AUX), but the device is in a low power mode→SDR+AUX is used, or
5. A new tech MDR Asset is available (e.g. Premium Content)→MDR+PRIME is used, or
6. A new tech MDR Asset is available (e.g. Premium Content), but the device is in a low power mode→MDR+AUX is used.

Example embodiments that relate to the distribution of high dynamic range images have been described herein with reference to Dolby Vision or Dolby Vision bitstreams as examples of HDR bitstreams. Those skilled in the art understand that HDR image data may be contained in HDR bitstreams that differ from Dolby Vision bitstreams. Embodiments of the present invention may be configured for operation with and support of other HDR bitstreams.

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the block-based reshaping of images with enhanced dynamic range, such as those described herein. The computer and/or IC may compute any of a variety of parameters or values that relate to the distribution of high dynamic range images described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the distribution of high dynamic range images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention".

As described herein, an embodiment of the present invention may thus relate to one or more of the example embodiments, which are enumerated below. Accordingly, the invention may be embodied in any of the forms described herein, including, but not limited to the following Enumerated Example Embodiments (EEEs) which described structure, features, and functionality of some portions of the present invention:

EEE1. A method for distributing High Dynamic Range (HDR) content to a playback device for displaying images based on the HDR content comprising: encoding the HDR content to an HDR bitstream, wherein encoding the HDR content comprises: mapping an HDR image in the HDR bitstream to a specified color volume base layer; generating a primary metadata packet based on the HDR content; generating an auxiliary metadata packet, wherein information in the auxiliary metadata packet is based on the capabilities of the playback device; encoding the specified color volume base layer to a coded base layer; and combining the coded base layer, the primary metadata packet, and the auxiliary metadata packet to produce the HDR bitstream; and decoding the HDR bitstream, wherein decoding the HDR bitstream comprises: selecting information from the primary metadata packet and the auxiliary metadata packet based on the capability of the playback device; and processing the coded base layer in the HDR bitstream based on the selected information to produce images for display on the playback device.

EEE2. The method as recited in enumerated example embodiment 1, wherein the primary metadata packet comprises: composer metadata and display mapping metadata.

EEE3. The method as recited in enumerated example embodiment 1 or 2, wherein the auxiliary metadata packet comprises: an identifier that describes the processing capabilities of the playback device; display mapping data; and a signal to bypass a compose operation when decoding the HDR bitstream.

EEE4. The method as recited in any of the enumerated example embodiments 1-3, wherein the HDR bitstream contains a specified coded base layer, wherein the selectable specified coded base layer is one of: a most compatible base layer that comprises a Standard Dynamic Range (SDR) color volume; a least compatible base layer that comprises a color volume corresponding to the color volume of the HDR image; and an intermediate compatible base layer that comprises a color volume corresponding to the playback devices.

EEE5. The method as recited in enumerated example embodiment 4, wherein processing the coded base layer comprises: determining the processing capability of the playback device, wherein the processing capability of the playback device is determined to support a processing capability selected from: SDR processing; most compatible base layer processing or intermediate compatible base layer processing; wherein if the playback device supports only SDR processing, then the HDR bitstream is rendered as an image with an SDR color volume; wherein if the playback device supports most compatible base layer processing, then determine if the target play back device supports dynamic processing, wherein if the target playback device does not support dynamic processing, then render the HDR bitstream with static display mapping, and wherein if the target playback device supports dynamic processing, then decode and render the HDR bitstream with dynamic display mapping; and wherein if the playback device supports intermediate compatible base layer processing, then determine if the target play back device supports dynamic processing, wherein if the target playback device does not support dynamic processing, then render the HDR bitstream with static display mapping, and wherein if the target playback device supports dynamic processing, then decode and render the HDR bitstream with dynamic display mapping.

EEE6. An apparatus comprising a processor and configured to perform the method as recited in any of the enumerated example embodiments 1-5.

EEE7. A non-transitory computer-readable storage medium having stored thereon computer-executable instructions for executing a method with one or more processors as recited in any of the enumerated example embodiment 1-5.

EEE8. A method for encoding High Dynamic Range (HDR) content to an HDR bitstream, wherein the method comprises: mapping an HDR image in the HDR content to a specified color volume base layer; generating a primary metadata packet based on the HDR content; generating an auxiliary metadata packet, wherein information in the auxiliary metadata packet is based on capabilities of the playback device; encoding the specified color volume base layer to a specified coded base layer; and combining the specified coded base layer, the primary metadata packet and the auxiliary metadata packet to produce the HDR bitstream.

EEE9. The method as recited in enumerated example embodiment 8, wherein the primary metadata packet comprises: composer metadata; and display mapping metadata; and wherein the auxiliary metadata packet comprises: an identifier that describes the processing capabilities of the playback device; display mapping data; and a signal to bypass a compose operation when decoding the HDR bitstream.

EEE10. The method as recited in enumerated example embodiment 8 or 9, wherein the HDR bitstream contains a specified coded base layer, wherein the specified coded base layer is one of: a most compatible base layer that comprises a Standard Dynamic Range (SDR) color volume; a least compatible base layer that comprises a color volume corresponding to the color volume of the HDR image; and an intermediate compatible base layer that comprises a color volume corresponding to the playback devices.

EEE11. An apparatus comprising a processor and configured to perform the method as recited in any of the enumerated example embodiments 8-10.

EEE12. A non-transitory computer-readable storage medium having stored thereon computer-executable instructions for executing a method with one or more processors as recited in any of the enumerated example embodiments 8-10.

EEE13. A method for decoding an HDR bitstream, wherein the HDR bitstream comprises a coded base layer, a primary metadata packet, and an auxiliary metadata packet, and the method comprises: selecting information from the primary metadata packet and the auxiliary metadata packet based on the capability of a target playback device; and processing the coded base layer in the HDR bitstream based on the selected information to produce images for display on the playback device.

EEE14. The method as recited in enumerated example embodiment 13, wherein processing the coded base layer comprises: decoding the coded base layer to a decoded base layer image; and mapping the decoded base layer image to a playback display based on data in the auxiliary metadata packet.

EEE15. The method as recited in enumerated example embodiment 13 or 14, wherein processing the coded base layer comprises: determining the processing capability of the playback device, wherein the processing capability of the playback device is determined to support a processing capability selected from: SDR processing; most compatible base layer processing or intermediate compatible base layer processing; and wherein if the playback device supports only SDR processing, then the HDR bitstream is rendered as an image with an SDR color volume; and wherein if the playback device supports a most compatible base layer processing, then determine if the target play back device supports dynamic processing, wherein if the playback device does not support dynamic processing, then render the HDR bitstream with static display mapping, and wherein if the playback device supports dynamic processing, then decode and render the HDR bitstream with dynamic display mapping; and wherein if the playback device supports an intermediate compatible base layer processing, then determine if the play back device supports dynamic processing, wherein if the playback device does not support dynamic processing, then render the HDR bitstream with static display mapping, and wherein if the playback device supports dynamic processing, then decode and render the HDR bitstream with dynamic display mapping.

EEE16. An apparatus comprising a processor and configured to perform the method as recited in any of the enumerated example embodiments 13-15.

EEE17. A non-transitory computer-readable storage medium having stored thereon computer-executable instructions for executing a method with one or more processors as recited in any of the enumerated example embodiments 13-15.

Example embodiments that relate to the distribution of high dynamic range images are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for decoding High Dynamic Range (HDR) content at a playback device for displaying images based on the HDR content comprising:
receiving an HDR bitstream in which the HDR content is encoded, wherein the HDR bitstream comprises:
a coded base layer encoded from a specified color volume base layer to which an HDR image in the HDR bitstream is mapped;
a primary metadata packet, wherein information in the primary metadata packet is based on the HDR content, wherein the primary metadata packet comprises:
composer metadata, that, when applied to the specified color volume base layer by a composer, causes the composer to reconstruct the original HDR content; and
display mapping metadata corresponding to the reconstructed HDR content for dynamic display mapping, that, when applied to the reconstructed HDR content by a dynamic display mapping process, causes the dynamic display mapping process to map the reconstructed HDR content to the capabilities of the playback device;
an auxiliary metadata packet, wherein the auxiliary metadata packet comprises:
static composer and display mapping metadata corresponding to the specified color volume base layer for static display mapping, that, when applied to the specified color volume base layer by a static display mapping process, causes the static display mapping process to map the specified color volume base layer to the capabilities of the playback device;
an identifier that describes the processing capabilities of the playback device required for applying the static composer and display mapping metadata; and
a signal to bypass a compose operation when decoding the HDR bitstream; and
additional auxiliary metadata packets based on playback device capability to add increasing levels of functionality;
and
decoding the HDR bitstream, wherein decoding the HDR bitstream comprises:
upon determining that the playback device matches the required processing capabilities of the primary metadata packet and that the playback device supports one or more functionalities defined by the additional auxiliary metadata packets, using the additional auxiliary metadata packets in combination with the primary metadata packet; and
processing the coded base layer in the HDR bitstream based on the selected metadata to produce images for display on the playback device.

2. The method according to claim 1, wherein the coded base layer is one of:
a most compatible base layer that comprises a Standard Dynamic Range (SDR) color volume;
a least compatible base layer that comprises a color volume corresponding to the color volume of the HDR image; and
an intermediate compatible base layer that comprises a color volume corresponding to the playback device.

3. The method according to claim 2, wherein processing the coded base layer comprises:
determining the processing capability of the playback device, wherein the processing capability of the playback device is determined to support a processing capability selected from: SDR processing; most compatible base layer processing or intermediate compatible base layer processing;

wherein if the playback device supports only SDR processing, then the HDR bitstream is rendered as an image with an SDR color volume;

wherein if the playback device supports most compatible base layer processing, then determine if the playback device supports dynamic processing, wherein if the playback device does not support dynamic processing, then render the HDR bitstream with static display mapping, and wherein if the playback device supports dynamic processing, then decode and render the HDR bitstream with dynamic display mapping; and wherein if the playback device supports intermediate compatible base layer processing, then determine if the playback device supports dynamic processing, wherein if the playback device does not support dynamic processing, then render the HDR bitstream with static display mapping, and wherein if the playback device supports dynamic processing, then decode and render the HDR bitstream with dynamic display mapping.

4. The method according to claim 1, wherein processing the coded base layer comprises:

decoding the coded base layer to a decoded base layer image; and mapping the decoded base layer image to a playback display based on data in the auxiliary metadata packet.

5. The method according to claim 1, further comprising, prior to receiving the HDR bitstream, encoding High Dynamic Range (HDR) content to an HDR bitstream, wherein the encoding comprises:

mapping an HDR image in the HDR content to a specified color volume base layer;

generating a primary metadata packet based on the HDR content, wherein the primary metadata packet comprises:

composer metadata, that, when applied to the specified color volume base layer by a composer, causes the composer to reconstruct the original HDR content; and display mapping metadata corresponding to the reconstructed HDR content for dynamic display mapping, that, when applied to the reconstructed HDR content by a dynamic display mapping process, causes the dynamic display mapping process to map the reconstructed HDR content to the capabilities of the playback device;

generating an auxiliary metadata packet, wherein the auxiliary metadata packet comprises:

static composer and display mapping metadata corresponding to the specified color volume base layer for static display mapping, that, when applied to the specified color volume base layer by a static display mapping process, causes the static display mapping process to map the specified color volume base layer to the capabilities of the playback device;

an identifier that describes the processing capabilities of the playback device required for applying the static composer and display mapping metadata; and a signal to bypass a compose operation when decoding the HDR bitstream;

generating additional auxiliary metadata packets based on playback device capability to add increasing levels of functionality;

encoding the specified color volume base layer to a coded base layer; and combining the coded base layer, the primary metadata packet, the auxiliary metadata packet, and the additional auxiliary metadata packets to produce the HDR bitstream.

6. A decoding apparatus comprising a processor and configured to perform the method according to claim 1.

7. A non-transitory computer-readable storage medium having stored thereon computer-executable instructions for executing the method according to claim 1 with one or more processors.

* * * * *